Figure 1:
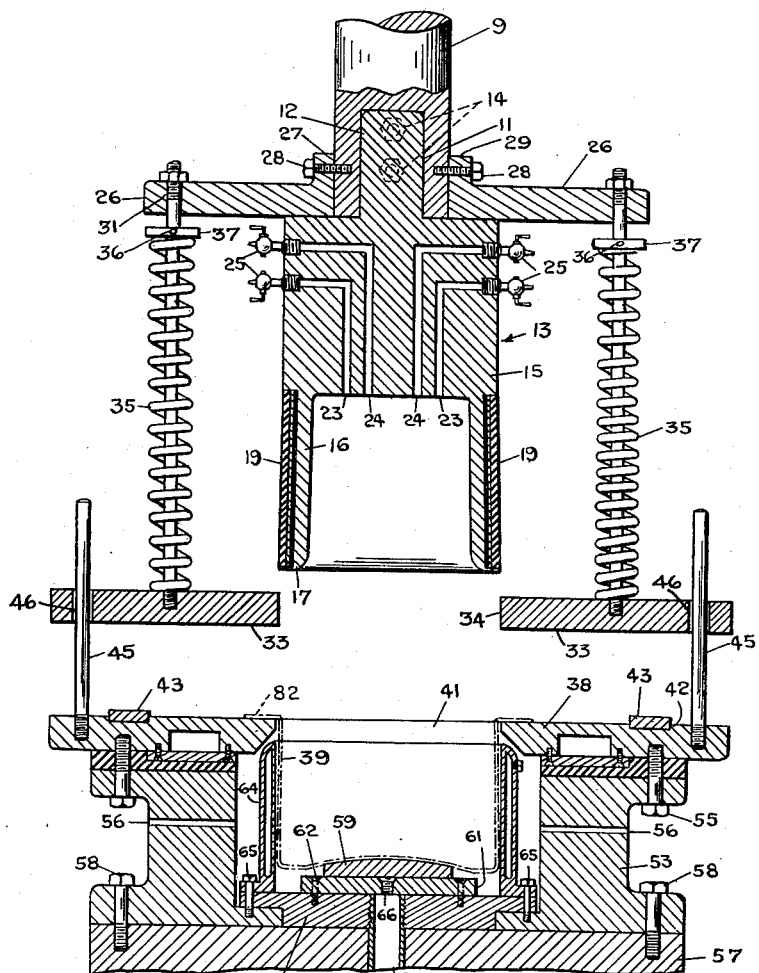

Nov. 28, 1950  H. E. SMITH  2,531,539
APPARATUS FOR FORMING HOLLOW THERMOPLASTIC
CONTAINERS BY DRAWING
Filed June 19, 1945  2 Sheets-Sheet 1

INVENTOR.
HARRY E. SMITH.
BY
ATTORNEYS.

Nov. 28, 1950  H. E. SMITH  2,531,539
APPARATUS FOR FORMING HOLLOW THERMOPLASTIC
CONTAINERS BY DRAWING
Filed June 19, 1945  2 Sheets-Sheet 2
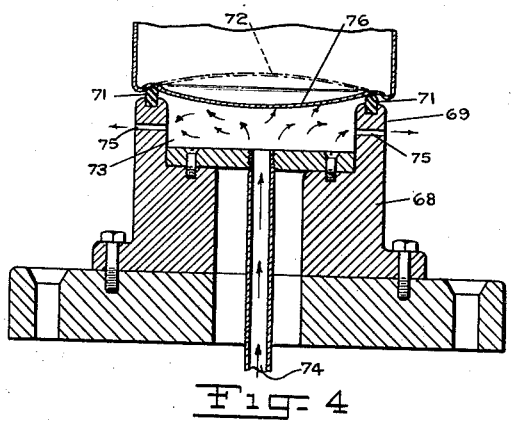
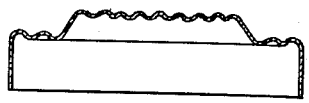
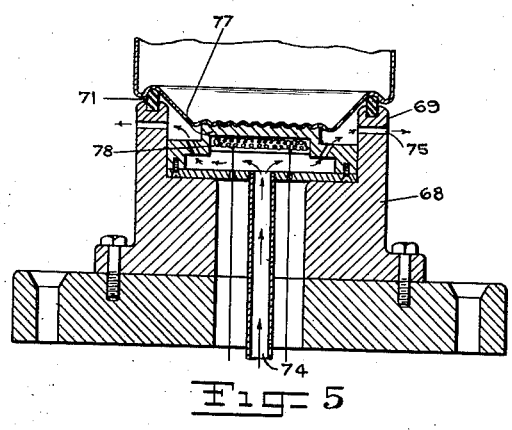
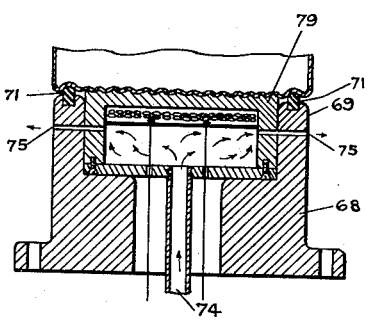
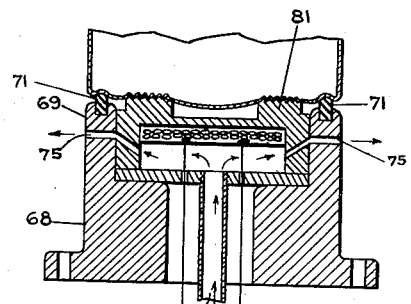
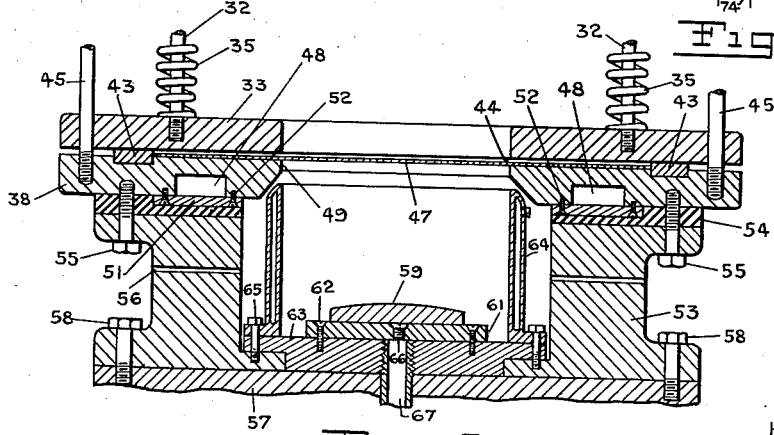
INVENTOR.
HARRY E. SMITH.
BY
ATTORNEYS.

Patented Nov. 28, 1950

2,531,539

UNITED STATES PATENT OFFICE 2,531,539

APPARATUS FOR FORMING HOLLOW THERMOPLASTIC CONTAINERS BY DRAWING

Harry E. Smith, Little Silver, N. J., assignor to Celanese Corporation of America, a corporation of Delaware Application June 19, 1945, Serial No. 600,347

10 Claims. (Cl. 18—19)

This invention relates to the shaping of sheet material, and relates more particularly to the novel apparatus for the shaping of thermoplastic sheet material.

While the die structures of this invention may be employed for the shaping of sheets of plastic sheet material into various forms, it is particularly applicable to the drawing of hol'ow container bodies and covers therefor from plastic sheet material having a basis of a thermoplastic compound such as, for example, nitrocellulose, cellulose acetate, cellulose propionate, cellulose butyrate, ethyl cellulose, benzyl cellulose, as well as ether-esters of cellulose, mixed esters of cellulose, synthetic resins and polymerization products. This invention, therefore, will be described in connection with the drawing of hollow container bodies from thermoplastic sheet material or blanks.

As commonly practiced in the plastic industry, the manufacture of hollow container bodies or covers involves the use of a drawing die structure, made of metal or other suitable material. The die structure comprises a suitably supported force member, a hold-down plate, a supporting base in which is fixed a female die and, if desired or necessary, a suitable cut-off member. The female die and the hold-down plate are heated by suitable means to the proper drawing or forming temperature for the particular type of plastic being processed. The force member may also be heated, but it is generally maintained at normal room temperature without provision for heating. If it is desirable to dissipate any absorbed heat, means may be provided for lowering the temperature of the force member in order to maintain it at sub-normal temperature. The hold-down plate is located and is suitably supported directly above the female die member and is adapted to hold the plastic sheet material against the working surface of the female die member with just sufficient pressure to permit a smooth and uniform drawing of said plastic sheet by the movement of the force into the female die. Immediately prior to being placed in the die structure for the drawing operation, the thermoplastic sheet material or blank is generally subjected to a short period of preheating over the entire area thereof in order to obtain adequate and uniform plasticity for the particular type of plastic being processed. Normally separate die structures are employed for drawing the container body and the telescopic cover for a complete container.

When drawing hollow plastic container bodies and covers in the foregoing conventional manner, certain undesirable and objectionable quality characteristics manifest themselves. The predominating and most serious objection is the presence of unsightly surface blemishes particularly on the side-wall, and to some extent on the top and/or bottom surface of such bodies or covers, whose end shape or contour involves partly depressed, extended, stepped, concave, convex or compound-curved surfaces. The blemishes are most objectionable in deep-drawn transparent bodies or covers, especially when viewed by transmitted light thus causing more or less light refraction, and result in the appearance of so-called small mark-offs, off-sets, rings, heat-marks, blisters, pits, pimples and streaks.

It is an important object of this invention to provide an improved die structure for the drawing of hollow container bodies and covers from thermoplastic material, which will be free from the foregoing and other undesirable and objectionable characteristics.

Another object of this invention is the provision of improved apparatus for the drawing of hollow thermoplastic container bodies and covers employing both mechanical and fluid pressure.

Still another object of this invention is the provision of apparatus for the drawing of hollow thermoplastic container bodies and telescopic covers therefor from the same die.

A further object of this invention is the provision of an apparatus for the drawing of hollow thermoplastic container bodies and telescopic covers therefor from the same die, and at the same time, by the use of suitable interchangeable end former elements, producing at the closed end surface of the container bodies and covers flat, concave, convex, or compound-curve effects with either an overall plain gloss effect, or a partial plain gloss effect decorated with embossed patterns, trade-marks or other insignia free from surface blemishes.

Other objects of this invention, together with certain details of construction and combination of parts, will appear from the following detailed description and drawings.

Figure 2:
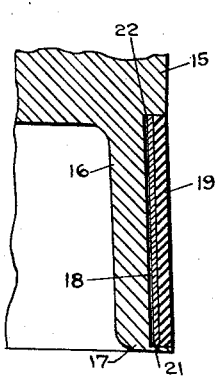

In the drawings wherein certain preferred embodiments of my invention are shown:

Figure 1 is a vertical cross-sectional view of a die-assembly constructed in accordance with my invention, Figure 2 is a vertical sectional detail view, on a slightly larger scale, showing the construction of my novel force member, Figure 3 is a vertical sectional view showing the structural details of the female die elements with a forming pad in position, Figures 4, 5, 6 and 7 are vertical sectional views, on an enlarged scale, of modifications of end-formers, and Figure 8 is a vertical cross-sectional view of a cover formed by the use of an end former.

Like reference numerals indicate like parts throughout the several views of the drawings.

In its broadest aspect, this invention contemplates the shaping of a thermoplastic blank, preheated differentially or locally, into closed end cylindrical bodies by means of a shaping press comprising a force of novel construction which is adapted to draw the blank from between blank contacting surfaces of novel design into the female die opening in which a former for contouring the closed end is carried.

Referring now to the drawings for a detailed description of this invention, and particularly to Figure 1, the reference numeral 9 indicates a ram of a press, preferably of the type shown and described in application S. No. 554,888, filed September 20, 1944, now U. S. Patent No. 2,429,960, issued October 28, 1947. In fact, the present die structure in substantially its entirety may be incorporated in the process of said prior application. The ram 9 is provided with an opening 11 for receiving a projection 12 of a hollow force, or male die, generally indicated by reference numeral 13, bolts 14 retaining the force on said ram.

The force 13 comprises a solid portion 15 of any suitable material having an integral hollow portion 16 the free edge 17 of which forms a forming lip. The outer surface of the hollow portion of the force 13 is cut away to form a circumferential channel 18 for receiving a cylindrical cushion 19 which is about ⅛" in thickness and preferably of very smooth, soft, resilient material such as rubber. A packing band 21 of a stiff fabric coated with coarse abrasive is preferably employed between the rubber cushion 19 and the outer wall of the force 13. The rubber cushion 19 is firmly supported in the channel 18 by being tautly stretched over the coarse abrasive surface of the packing band 21 and the cushion is made to conform accurately to the desired outside diameter by the insertion of thin paper shims 22 between the inner surface of the packing band 21 and the bottom of the channel 18.

The rubber cushion 19 is preferably prepared as follows: A piece of commercial grade vulcanized soft rubber tubing of the desired length and having a $\frac{3}{32}$" wall thickness is turned inside out and stretched taut over a suitable mandrel that is somewhat larger in diameter than the diameter of the channel 18. The uneven inside surface of the rubber tubing is ground to a uniform finish with a high speed Carborundum abrasive wheel, such as #100 grit, working along the length of the tubing while it is being rotated parallel with the face of the abrasive wheel. After leveling the inside surface of the tubing, it is removed from the mandrel and is again mounted thereon with the smooth inside surface against the face of the mandrel. The rough and uneven outer surface of the tubing is then accurately ground to a smooth finish wall-thickness of ⅛". A cushion prepared in this manner prevents the contractive pressure of the heated plastic from developing objectionable surface blemishes on the inside surface of the side wall during the drawing of container bodies or covers. If desired, powdered talc or other soft lubricant may be applied to the outer surface of cushion 19 in order to protect the smooth surface thereof and to facilitate the removal of the drawn body or cover.

The force 13 is provided with fluid ducts 23 and 24, the purpose of which will hereinafter be set forth. Stop cocks 25 are placed in the ducts to control the flow of fluid therethrough.

Mounted on ram 9 is a plate 26 having a flanged central opening 27 for receiving the end of said ram, the plate being held in position on said ram by means of bolts 28 passing through the flange 29. The plate 26 is also provided with openings 31 for slidably receiving the upper ends of support rods 32 to the lower ends of which is fixed a hold-down plate 33 apertured at 34 to permit the passage therethrough of the force 13. Expansible springs 35 are carried by the support rods 32 and are fastened at their upper end by means of pins 36 to collars 37 that are slidably mounted on said support rods. The force 13 cooperates with die plate 38 of the female die to form the plastic container bodies and covers therefor. Said die plate will be more fully described hereinafter.

The design of force 13 differs in still another structural detail from conventional practice in the dimensional relation of the maximum diameter of the forming lip 17, and the maximum diameter of the cylindrical cushion 19 at the point of the maximum depth of draw. For example, in drawing a container body such as shown by dot-dash line 39 in Figure 1 from .020 cellulose acetate plastic, the maximum diameter of the forming lip is 3.028" and the diameter of the cylindrical cushion 19 at the point of maximum point of draw 3.025" which results in an ascending taper of the force member 13 that is equivalent to substantially 0.0015" in diameter per inch of draw. Accordingly, force member 13 has an ascending taper whereas conventional practice, for the purpose of facilitating the withdrawal of the force member, employs a descending taper of the force of at least 0.0015" per inch of draw from the maximum point of draw to the lower extremity of the force member or side wall. This ascending taper of force member 13, shown more clearly in Figure 2, further minimizes the contractive pressure of the heated plastic on the surface of the cylindrical cushion 19 which, in association with the amount of clearance with the aperture 41 of die plate 38 and the diameter of the force member 13 at the point of maximum depth of draw, together with the structural details of the force member previously described, further insures against the development of surface blemishes on the inside surface of the plastic body or cover.

The die plate 38 has affixed thereto in any suitable manner, on the surface or in an annular groove 42, a spacer ring 43 of such thickness as to establish a space 44 of predetermined size between the upper or working surface of the die plate 38 and the hold-down plate 33 (see Figure 3). The downward travel of ram 9, guided by means of guide rods 45 affixed to die plate 38 and passing through openings 46 in hold-down plate 33, is effected against the action of springs 35 and presses the lower or working surface of hold-down plate 33 tightly against the upper surface of spacer ring 43. The thickness of the spacer ring or separating means depends upon the average thickness of the plastic material to be operated upon, the depth of draw, the area of the plastic blank, and the degree of plasticity in the plastic blank. For example, when drawing a container body 39 from .020" thick cellulose acetate plastic, the thickness of the spacer ring is such as to make the fixed space .023" wide, the depth of draw 1⅞", the area of the blank 29.46 square inches and the degree of plasticity that is established at a drawing or forming temperature of 280° F. When the plastic blank 47 is heated to the forming temperature, it is positioned inside the spacer ring 43 on the working surface of die plate 38, preheated or heated by any suitable means passing through channel 48 in the die plate, with the hold-down plate 33 held rigidly against the upper surface of spacer ring 43. The normal expansion in the thickness of the heated plastic should be just sufficient to contact with the die plate 38 and hold-down plate 33 without developing wrinkles, fractures or splits and without producing any other blemishes on the surfaces of the container body blank.

The working surfaces of hold-down plate 33 and the die plate 38 are finished in a novel manner. Thus, said hold-down plate and said die plate which may be made of any suitable material and preferably low-carbon machine steel, are first machined and ground so as to be practically level and parallel with each other. The working surfaces are then subjected to circular grinding by means of a Carborundum abrasive wheel of about #100 grit revolving at high speed at right angles to and working across the rotating surfaces of said plates. This produces circular surface structures composed of a multitude of adjoining minute grooves on the apices of which the heated plastic must initially contact and from between which surfaces it is easily and uniformly drawn by the downward travel of the force 13 over the polished edge 49 of the aperture 41 of the die plate 38. Following the circular grinding operation, the working surfaces of the plates may be electro-plated with a hard chromium finish which still further facilitates the movement of the heated plastic from the fixed space 44 and which also imparts a very hard and substantially permanent, wear-free protective coating to said working surfaces.

The channel 48 in die plate 38 is covered by an annular cover plate 51 fixed to the bottom of the die plate by means of screws 52. The die plate is carried on a support 53 but is separated therefrom by means of an insulating gasket 54; the support, insulating gasket and die plate being held together by screw bolts 55. The support 53 is provided with vents 56 and is carried on the bed 57 of the press, being fixed thereto by means of screw bolts 58.

Simultaneously with the formation of the container body or cover, the closed end thereof may be given a multi-concave and/or an embossed decorative surface, either mechanically or by means of fluid pressure.

In Figure 1, means is shown for mechanically producing a concave surface on the closed end of the container body. This means comprises a former pad 59 of the desired contour suitably attached to a base 61 which in turn is attached by means of screw bolts 62 to a base 63. Both the former pad 59 and base 61 are mounted within a cooling chamber 64 fixed to the base 63 by means of bolts 65. In this arrangement, the concave contour of the closed end surface is obtained by means of the mechanical pressure of the force action on the former pad 59. However, substantially the same concave contour could also be produced by my novel apparatus without the use of the former pad 59. Thus, the former pad may be removed from the base 61 together with plug 66. Air under pressure is then supplied through duct 67 and the plug opening in base 61 causing the closed end to dome and form the desired contour.

In Figures 4, 5, 6 and 7, there are shown four different arrangements of end-forming elements which may be employed in conjunction with the other forming elements making up the apparatus of the present invention, replacing the end-former element shown in Figure 1. It will be appreciated, however, that within the purview of this invention there are many other arrangements for imparting closed-end contours with an over-all plain gloss finish, or attractive over-all embossed decorations, or combinations of both.

Figure 4 shows an end former 68, made preferably of rigid, low-heat conducting material such as Masonite or like material, having an annular channeled flange 69 in the channel of which is mounted a ring-shaped soft rubber former pad 71 about ⅛" wide. This end-former element is adapted to produce a multi-concave plain gloss finish contour on the closed end. Thus, when drawing the container body from a suitably heated blank, the downward travel of the force 13 brings the heated plastic around the forming lip 17 in contact with the upper surface of former pad 71. Controlled fluid under reduced pressure, such as a partial vacuum, is supplied to the inside of hollow portion 16 of the force by means of duct 23 acting on the inside surface of the heated plastic of the closed end, draws the plastic upward as shown in dot-dash lines 72 to the desired degree of concavity which is controlled by the degree of plasticity obtained by the preheating temperature that is established in the plastic blank by the local heating thereof prior to its insertion into the machine. The downward travel of force 13 seals off the upper end of the supplemental cooling chamber 73 with the closed end of the formed plastic blank. Cold air at a low pressure is directed into chamber 73 by means of a supply pipe 74, the cold air escaping through vents 75 in the flange portion of the former elements 68, thus rapidly cooling and setting the plastic comprising the closed end. At the same time that the cold air is directed against the closed end by means of supply pipe 74, it is also directed against the side wall by means of cooling chamber 64 (see Figures 1 and 3) which is independently connected to the cold air source thus rapidly cooling and setting the completely formed container body.

When drawing a multi-convexed closed end plain gloss finish cover, the die assembly shown in Figure 4 may also be employed. However, in place of the controlled vacuum, a positive air pressure of about 40 pounds per square inch is applied to the inside of hollow portion 16 of the force by means of inlet duct 24. The desired extent of convexity, as shown in full lines 76 in Figure 4, is obtained as a result of the degree of plasticity obtained by virtue of the preheating temperature employed that is established in the plastic blank by the local heating thereof, and the application of controlled air pressure against the inside surface of the heated plastic through the hollow portion 16 of the force.

Figure 5 shows the end former 68 fitted with a brass or other suitable metallic embossing element 77 having a circular engraved face of the required diameter and an electrical heating coil 78 for heating the same. The end former shown in this former is employed for the production of a multi-convex closed end contoured gloss finish cover whose central area embodies an embossed decoration. A cover shaped and embossed substantially like a cover produced with the end former of Figure 5 is shown in cross-section in Figure 8. With the end former shown in Figure 5, the same method of procedure is followed as that employed in connection with Figure 4 except that for the purpose of establishing the proper degree of convexity a fixed vertical dimension of suitable degree is maintained between the face of the embossing element 77 and the upper face of the former pad 71, and the heating element 78 is so adjusted as to establish the desired temperature, i. e. a temperature of about 290° F., in the embossing element.

In Figure 6, there is shown an assembled end former which is fitted with a flat-top brass embossing element 79, the entire face of which embodies an engine-turned decoration, while Figure 7 shows an assembled former fitted with an open center brass embossing element 81 producing yet another decorative effect on the closed end.

It is important that the plastic blank employed in the drawing or forming operation be properly preheated before the same is placed in position within spacer ring 43 on die plate 38. Proper temperature conditions are established on the plastic blank by differentially or locally heating the same. To obtain the most satisfactory surface quality in the completed container body, a sufficiently high temperature, and thus a high degree of plasticity, is given to such areas of the blank where maximum stress is developed during the forming operation, and a substantially lower temperature is given the plastic blank to such areas where a minimum of stress is developed. Thus in drawing a container body, the outer circumferential area of the plastic blank, where it comprises plastic material having a basis of cellulose acetate and has a thickness of .020″, is given a temperature of about 280° F., by suitable preheating means (not shown), for the satisfactory deep draw of the side wall, while the central area of the plastic blank which forms the concaved closed end and where the minimum stress is developed is preheated to about 150° F. It is to be understood, however, that the temperature conditions and the areas of the blank which are differentially heated will depend upon the nature and thickness of the plastic material employed and the type of container body or cover being formed. It may be necessary or desirable to differentially or locally heat the plastic blank to produce three or more areas each having a different temperature and therefore, a different degree of plasticity.

Following the differential heating of the plastic blank, it is quickly transferred to the working surface of die plate 38. The ram 9 is then immediately lowered bringing down the hold-down plate 33, properly centered by guide rods 45, until it comes into contact with spacer ring 43. The continued downward travel of the ram brings increasing pressure to bear on the springs 35 by plate 26 pressing on collars 37 until the hold-down plate is rigidly held against the upper surface of the spacer ring 43.

Further downward travel of the ram carries the hollow portion 16 of force 13 into the aperture 34 of the hold-down plate and brings the forming lip 17 of the force into contact with the upper surface of the preheated plastic blank. As the downward travel of the ram continues, the force draws the plastic blank from between the working surfaces of the hold-down plate and die plate into the forming aperture 41 of the die plate. The drawing of the plastic blank from between the working surfaces of the hold-down plate and the die plate is continued, thus forming a cylindrical shape closely fitting completely around the cylindrical rubber cushion 19 on the force extending from the forming lip 17 to the maximum depth of draw which is located slightly below the upper end of the rubber cushion.

At a point slightly less than the maximum depth of draw, the central area of the outer surface of the closed end of the now cylindrical body is pressed against the former pad 59. The continued downward travel of the ram to the maximum depth of draw further presses the closed end of the cylindrical body against the former pad until the outer periphery of the closed end is pressed between the forming lip 17 and the outer periphery of the former pad, thereby producing in the closed end a multi-concave contour.

On raising the ram, the cylindrical body formed is carried upwardly on the force until the flange 82 on the cylindrical body comes into contact with the edge of aperture 34 of the hold-down plate and is so stripped from the force. If desired, the flange 82 may be removed from the cylindrical body in any convenient manner.

As will appear from the foregoing description, the die structure of the instant invention is such that container bodies and telescopic covers therefor may be made from the same die, continuously if the said die structure is incorporated in the press of application S. No. 554,888. The telescoping of the cover on the container body is effectively accomplished by beading the open ends thereof, preferably in the manner shown and described in my abandoned application S. No. 600,346, filed June 19, 1945.

It is to be understood that the foregoing detailed description is given merely by way of illustration and that many variations may be made therein without departing from the spirit of my invention.

Having described my invention, what I desire to secure by Letters Patent is:

1. Apparatus for shaping thermoplastic sheet material, comprising a female die including an apertured die plate, a hold-down plate having an extended flat surface adapted to contact the thermoplastic sheet material for cooperating with said die plate to maintain the thermoplastic sheet material therebetween, means on said die plate for preventing contact of said hold-down plate with said die plate to limit the force exerted by said hold-down plate on said thermoplastic material, the under surface of said hold-down plate and the upper surface of said die plate being roughened, and a force adapted to pass through said apertured die plate for cooperating with said female die for shaping said thermoplastic sheet material.

2. Apparatus for shaping thermoplastic sheet material, comprising a female die including an apertured die plate, a hold-down plate for cooperating with said die plate to maintain the thermoplastic sheet material therebetween, means on said die plate for preventing contact of said hold-down plate with said die plate, the under surface of said hold-down plate and the upper surface of said die plate having minute grooves therein and a finish of chromium thereon, and a force for cooperating with said female die for shaping said thermoplastic sheet material.

3. Apparatus for shaping thermoplastic sheet material, comprising a female die including an apertured die plate, a hold-down plate for cooperating with said die plate to maintain the thermoplastic sheet material therebetween, means on said die plate for preventing contact of said hold-down plate with said die plate, and a force, having an ascending taper, for cooperating with said female die for shaping said thermoplastic sheet material.

4. Apparatus for shaping thermoplastic sheet material, comprising a female die including an apertured die plate, a hold-down plate for cooperating with said die plate to maintain the thermoplastic sheet material therebetween, means on said die plate for preventing contact of said hold-down plate with said die plate, and a hollow force, having a layer of smooth soft rubber tapering upwardly on the outer surface thereof, for cooperating with said female die for shaping said thermoplastic sheet material.

5. Apparatus for shaping thermoplastic material to form a cylindrical body having a closed end, comprising a female die including an apertured die plate, a hold-down plate having an extended flat surface adapted to contact the thermoplastic sheet material for cooperating with said die plate to maintain the thermoplastic sheet material therebetween, a spacer ring on said die plate for preventing contact of said hold-down plate with said die plate to limit the force exerted by said hold-down plate on said thermoplastic material, a force adapted to pass through said apertured die plate for cooperating with said female die plate for shaping said thermoplastic sheet material, and means within and spaced from the walls of said female die cooperating with said force for contouring the closed end of said cylindrical body.

6. Apparatus for shaping thermoplastic material to form a cylindrical body having a closed end, comprising a female die including an apertured die plate, a hold-down plate for cooperating with said die plate to maintain the thermoplastic sheet material therebetween, a spacer ring on said die plate for preventing contact of said hold-down plate with said die plate, a force for cooperating with said female die plate for shaping said thermoplastic sheet material, an end former within and spaced from the walls of said female die and means to admit a fluid for cooperating with said force and said end former for contouring the closed end of said cylindrical body.

7. Apparatus for shaping thermoplastic material to form a cylindrical body having a closed end, comprising a female die including an apertured die plate, a hold-down plate cooperating with said die plate to maintain a thermoplastic sheet material therebetween, the under surface of said hold-down plate and the upper surface of said die plate having minute grooves therein and a finish of chromium thereon, a spacer ring on said die plate for preventing contact of said hold-down plate with said die plate, and a force, having a layer of smooth rubber tapering upwardly on the outer surface thereof, for cooperating with said female die for shaping said thermoplastic sheet material.

8. Apparatus for shaping thermoplastic material to form a cylindrical body having a closed end, comprising a female die including an apertured die plate, a hold-down plate cooperating with said die plate to maintain a thermoplastic sheet material therebetween, the under surface of said hold-down plate and the upper surface of said die plate having minute grooves therein and a finish of chromium thereon, a spacer ring on said die plate for preventing contact of said hold-down plate with said die plate, a hollow force having a layer of smooth rubber tapering upwardly on the outer surface thereof, for cooperating with said female die for shaping said thermoplastic sheet material, and means within and spaced from the walls of said female die cooperating with said force for contouring the closed end of said cylindrical body.

9. Apparatus for shaping thermoplastic material to form a cylindrical body having a closed end, comprising a female die including an apertured die plate, a hold-down plate cooperating with said die plate to maintain a thermoplastic sheet material therebetween, the under surface of said hold-down plate and the upper surface of said die plate having minute grooves therein and a finish of chromium thereon, a spacer ring on said die plate for preventing contact of said hold-down plate with said die plate, a hollow force having a layer of smooth rubber tapering upwardly on the outer surface thereof, for cooperating with said female die for shaping said thermoplastic sheet material, an end former within and spaced from the walls of said female die and means to admit a fluid for cooperating with said force and said end former for contouring the closed end of said cylindrical body.

10. Apparatus for shaping thermoplastic material to form a cylindrical body having a closed end, comprising a female die including an apertured die plate, a hold-down plate cooperating with said die plate to maintain a thermoplastic sheet material therebetween, the under surface of said hold-down plate and the upper surface of said die plate having minute grooves therein and a finish of chromium thereon, a spacer ring on said die plate for preventing contact of said hold-down plate with said die plate, a hollow force having a layer of smooth rubber tapering upwardly on the outer surface thereof, for cooperating with said female die for shaping said thermoplastic sheet material, an end former within and spaced from the walls of said female die and means to admit a fluid for cooperating with said force and said end former for contouring the closed end of said cylindrical body, and means for cooling the formed cylindrical body.

HARRY E. SMITH.

REFERENCES CITED

The following references are of record in the file of this patent:

UNITED STATES PATENTS

| Number | Name | Date |
|---|---|---|
| 1,671,577 | Gluckin et al. | May 29, 1928 |
| 1,764,215 | Kupper | June 17, 1930 |
| 2,255,116 | Helmstaedter | Sept. 9, 1941 |
| 2,255,117 | Helmstaedter | Sept. 9, 1941 |
| 2,354,564 | Wiley | July 25, 1944 |
| 2,377,946 | Leary | June 12, 1945 |

FOREIGN PATENTS

| Number | Country | Date |
|---|---|---|
| 194,118 | France | Nov. 15, 1888 |
| 392,952 | Great Britain | May 22, 1932 |